Nov. 1, 1932.  C. M. ELLENBERGER  1,886,270
TIRE COVER
Filed Sept. 19, 1927
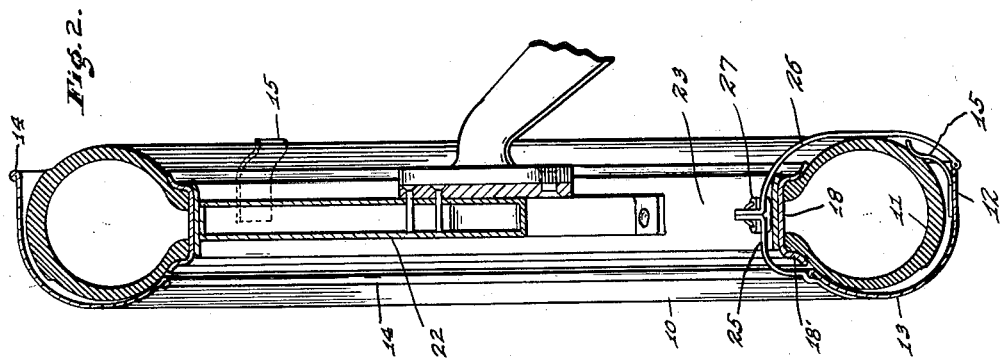
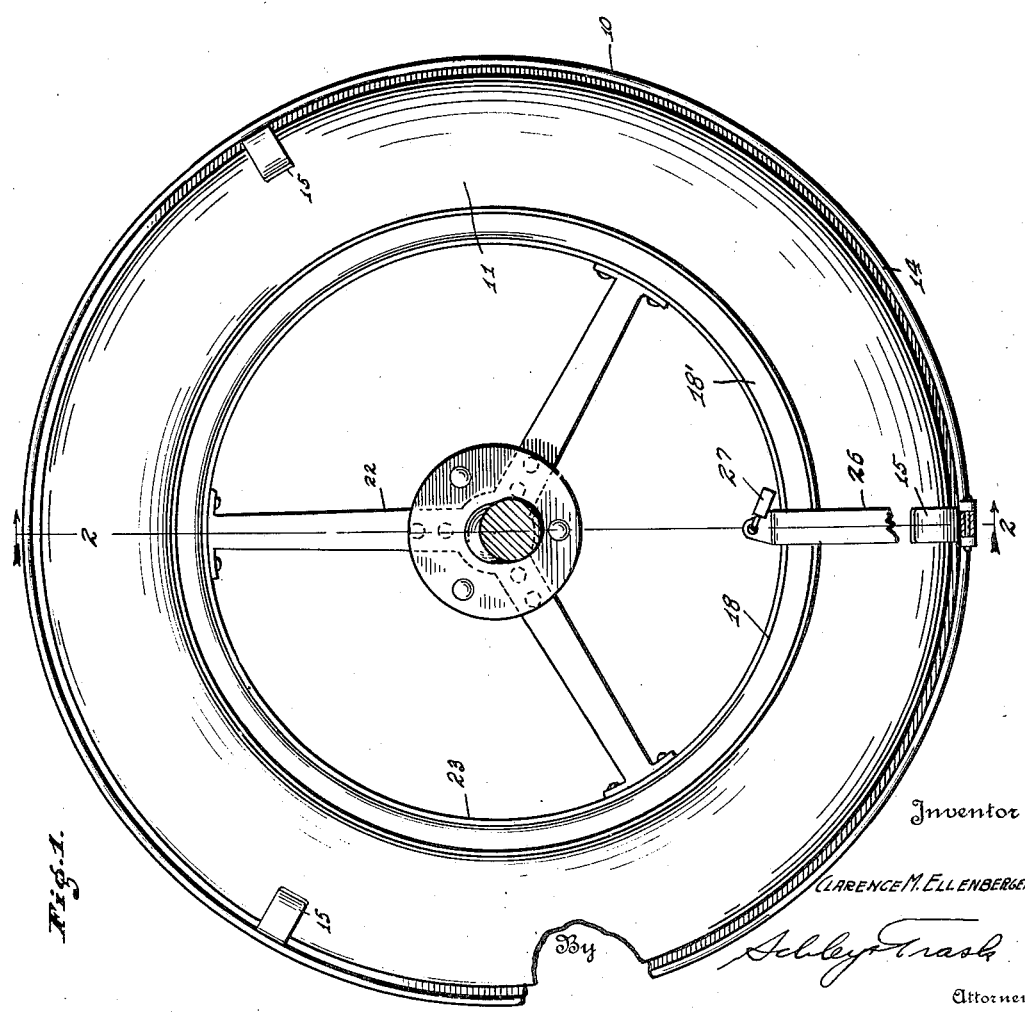
Inventor
Clarence M. Ellenberger,
By Ashley Trask
Attorney Patented Nov. 1, 1932

1,886,270

UNITED STATES PATENT OFFICE

CLARENCE M. ELLENBERGER, OF INDIANAPOLIS, INDIANA, ASSIGNOR TO LYON COVER COMPANY, OF DETROIT, MICHIGAN, A CORPORATION OF MICHIGAN

TIRE COVER

Application filed September 19, 1927. Serial No. 220,411.

My invention is concerned with covers for the spare tires carried by automobiles. Nearly all such covers of which I am aware are constructed of fabric and have the disadvantage that they are attached and detached with considerable difficulty. Such tire covers are additionally objectionable in that they frequently collect moisture and not only rot themselves but also have a harmful effect upon the tire to which they are applied.

It is the object of my invention to produce a spare tire cover which may be attached to or detached from the spare tire with ease, which will form an adequate protection for the tire, which can be made in quantities at less cost than fabric covers, and which will be attractive in appearance. A further object of my invention is to incorporate with such tire cover a suitable lock adapted to prevent theft of the tire and cover.

I accomplish the above object by constructing my tire cover of sheet metal or other rigid material drawn, stamped, rolled, or otherwise formed into an annulus adapted to be slid onto and off of the tire by axial movement and which, when in place on the tire, will overlie the tread and the outer side wall of the tire. I provide means for holding the tire cover in place; and, if desired, I provide a locking device by which the cover and tire may be secured to the tire carrier.

The accompanying drawing illustrates my invention: Fig. 1 is an elevation of the inner face of the spare tire with my tire cover in place thereon; Fig. 2 is a vertical section on the line 2—2 of Fig. 1.

My tire cover may, in accordance with the illustrated form of the invention, be formed in a single piece 10 of sheet metal or similar material which possess the required characteristics and which is drawn, stamped, rolled, or pressed into an annular form adapted to be mounted upon the spare tire 11 by axial movement. The cover body 10 is formed with an outer wall 12 and a side wall 13 which are desirably continuous with each other, the outer wall 12 overlying the tread of the tire and the side wall 13 overlying the side wall of the tire. The edges of the two walls 12 and 13 are preferably rolled over to form beads 14 which serve to strengthen the cover.

Any convenient means may be employed for holding the tire cover 10 in place on the tire 11, two of such means being illustrated in the drawing. In Figs. 1 and 2, the cover 10 is shown as provided with a series of clips 15, preferably three or more in number. These clips 15 are formed of spring steel or other elastic material secured to the outer wall 12 of the cover 10 and having free ends adapted to bear against the inner side wall of the tire to keep the cover in place thereon. The spring fingers should obviously have sufficient resiliency to bend far enough to move over the periphery of the tire. In applying or removing the tire cover, the spring clips 15 are deflected to pass over the tread of the tire.

When my tire cover is used in connection with a spare tire mounted upon a tire carrier 22 having a circular rim 23, I may incorporate with my tire cover a locking device for preventing unauthorized removal of either the tire cover or the tire. To this end, I may secure to the side wall 13 of the cover 10 a fixed strap 25 projecting inwardly and preferably partway through the rim 23 of the tire carrier. To the outer wall 12 of the tire cover I pivotally attach a movable strap 26, the free end of which is adapted to be moved into close association with the end of the strap 25. The two ends of the straps 25 and 26 may be provided with alined holes for the reception of the hasp of a padlock 27, as is clear from Figs. 1 and 2.

Desirably, my tire cover is formed so that the diameter of the bead 14 forming the terminal edge of the side wall 13 is considerably larger than the diameter of the flange 18' of the tire rim 18, as the means which hold the tire cover in place on the tire will tend to hold the tire and its cover concentric and will thus tend to prevent contact of the rim flange 18' and the cover 10. Such a contact would be undesirable, for it would inevitably result in the creation of disagreeable rattles. While this tendency of the cover-holding means exists, I prefer to insure that no contact of the side wall 13 with the rim-edge 18' can occur, by making the outer wall 12 of the tire cover 10 of such a diameter that it will engage the tire tread before the side wall 13 can strike the rim flange 18′.

A tire cover such as I have described is readily attached and detached from the associated spare tire. Being made of metal or similar material, it is very durable in comparison with the fabric covers normally used. Further, it is readily finished in the same colors as are employed on the body of the automobile, and thus adds to the appearance thereof.

I claim as my invention:—

1. A spare tire cover for protecting a spare tire mounted on a tire carrier including a single metal side portion of arcuate shape formed to cover the outer side of the tire, and a metal rim to cover the periphery of the tire and of sufficient length to extend around more than one half of the periphery of said tire, said side portion retaining said rim from radial spreading, said rim including a portion projecting laterally from said side portion across the median plane of the tire and being of a radius sufficient to enable it to snugly fit over the tire and means associated with said rim portion for retaining said portion on said tire, said means terminating at such a distance inwardly from the outer periphery of said tire at the other and inner side of said spare tire as to permit shoving of said cover into its proper tire protecting position and at the same time serve as a retaining means after said cover is in such position.

2. A spare tire cover for protecting a spare tire mounted on a tire carrier, including a single metal side portion of ring-like shape and formed to cover the outer side of the spare tire and a metal rim including a single portion of substantially continuous cylindrical form associated with said side portion and projecting laterally from it across the median plane of the tire and being of a radius sufficient to enable it to snugly fit over the tire and means associated with said metal rim portion for retaining said portion on said tire and adapted to enable the ready mounting of said rim portion on said tire, leaving the other and rear side of the tire uncovered by the complete tire cover, said means when the cover is on the tire causing said rim portion to be retained on said tire through engagement of said tire thereby to the rear of said median plane and inwardly of the outer periphery of the tire a distance sufficiently great to enable the cover to be retained on the tire against accidental displacement and yet sufficiently small to permit of the ready shoving of the rim into its proper tire protecting position.

3. A spare tire cover for protecting a spare tire mounted on a tire carrier, including a metal side portion of ring-like shape and formed to cover the outer side of the spare tire and a metal rim including a portion of substantially continuous cylindrical form associated with said side portion and projecting laterally from it across the median plane of the tire and being of a radius sufficient to enable it to snugly fit over the tire, and clamping means associated with said metal rim portion for retaining said portion on said tire and adapted to enable the cover to be moved axially onto the tire, said means when the cover is on the tire causing said rim portion to be retained on said tire through engagement of said tire thereby to the rear of said median plane and inwardly of the outer periphery of the tire a distance sufficiently great to enable the cover to be retained on the tire against accidental displacement and yet sufficiently small to permit of the ready shoving of the rim into its proper tire protecting position.

4. A square tire cover for protecting a spare tire mounted on a tire carrier, including a metal side portion of ring-like shape and formed to cover the outer side of the spare tire and a metal rim including a portion of substantially continuous cylindrical form associated with said side portion and projecting laterally from it across the median plane of the tire and being of a radius sufficient to enable it to snugly fit over the tire, and means associated with said metal rim portion for retaining said portion on said tire and adapted to enable the cover to be moved axially onto the tire, said means being expansible by axial movement of the cover onto said tire and thereafter contractible when the cover is on the tire to cause said rim portion to be retained on said tire through engagement of said tire thereby to the rear of said median plane and inwardly of the outer periphery of the tire a distance sufficiently great to enable the cover to be retained on the tire against accidental displacement and yet sufficiently small to permit of the ready shoving of the rim into its proper tire protecting position.

5. A metallic spare tire cover formed to be snapped into tire protecting position by shoving the same onto the tire including a side plate for protecting and abutting against the side of the tire and an arcuate rim-like means associated therewith for covering the periphery of the tire and including means expansible by the tire itself as said rim means is moved onto the periphery of said tire and thereafter contractible to engage over the tire at the other and rear side of the tire to retain said cover in proper tire protecting position.

6. A metallic spare tire cover designed to be snapped into tire protecting position by shoving the same towards the tire including a side plate for protecting and abutting against the side of the tire and an arcuate rim-like means associated therewith to cover and engage the periphery of the tire and having an inherent tendency to contract as it is snapped into position, said means being so shaped and proportioned that when in tire protecting position a portion of said means will be spaced inwardly from the outer periphery of the tire such a distance as to hold the cover in position and yet permit of the shoving of the tire cover into said position.

7. A metallic spare tire cover designed to be snapped into tire protecting position by shoving the same towards the tire including a side plate for protecting and abutting against the side of the tire and an arcuate rim-like means associated therewith to cover the periphery of the tire and having an inherent tendency to resist pressure as it is snapped into position, said means being so shaped and proportioned that when in tire protecting position a portion of said means will be spaced inwardly from the outer periphery of the tire such a distance as to hold the cover in position and yet permit of the shoving of the tire cover into said position.

8. A spare tire cover for protecting a spare tire mounted on a tire carrier including a single metal side portion of arcuate shape formed to cover the outer side of the tire, and a metal rim to cover the periphery of the tire and of sufficient length to extend around more than one half of the periphery of said tire, said side portion retaining said rim from radial spreading, said rim including a portion projecting laterally from said side portion across the median plane of the tire and being of a radius sufficient to enable it to snugly fit over the tire and means associated with said rim portion for retaining said portion on said tire, said means including a plurality of circumferentially spaced yieldable clamping elements and terminating at such a distance inwardly from the outer periphery of said tire at the other and inner side of said spare tire as to serve as a retaining means after said cover is in proper tire protecting position and yet being movable out of retaining engagement so as to permit shoving of said outer side and rim portion of the cover off of and onto the tire.

9. A spare tire cover for protecting a spare tire mounted on a tire carrier including a single metal side portion of arcuate shape formed to cover the outer side of the tire, and a metal rim to cover the periphery of the tire and of sufficient length to extend around more than one half of the periphery of said tire, said side portion retaining said rim from radial spreading, said rim including a portion projecting laterally from said side portion across the median plane of the tire and being of a radius sufficient to enable it to snugly fit over the tire and means associated with said rim portion for retaining said portion on said tire, said means terminating at such a distance inwardly from the outer periphery of said tire at the other and inner side of said spare tire as to serve as a retaining means after said cover is in tire protecting position, leaving said other and inner side of the spare tire uncovered by the tire cover, and including a plurality of circumferentially spaced spring clips, each of which is movable transversely and inwardly of the outer tire periphery into and out of cover retaining position and each being yieldable so as to accommodate slight variations in size and contour of the tire.

10. A spare tire cover for protecting a spare tire mounted on a tire carrier including a single metal side portion of arcuate shape formed to cover the outer side of the tire, and a metal rim to cover the periphery of the tire and of sufficient length to extend around more than one half of the periphery of said tire, said side portion retaining said rim from radial spreading, said rim including a portion projecting laterally from said side portion across the median plane of the tire and being of a radius sufficient to enable it to snugly fit over the tire and means associated with said rim portion for retaining said portion on said tire, said means terminating at such a distance inwardly from the outer periphery of said tire at the other and inner side of said spare tire as to serve as a retaining means after said cover is in tire protecting position and including yieldable tread engaging means for contacting the tire tread to the rear of the median line of the tire at a plurality of points and yet being movable out of retaining engagement so as to permit shoving of said outer side and rim portion off of and onto the tire.

11. A spare tire cover for protecting a spare tire mounted on a tire carrier including a single side portion substantially circumferentially rigid and of arcuate shape formed to cover the outer side of the tire and a rim to cover the periphery of the tire and of sufficient length to extend around substantially more than one-half of the periphery of said tire, said side portion aiding at the outer side of the tire to retain said rim from radial spreading, said rim including a portion projecting laterally from said side portion across the median plane of the tire and being of a radius sufficient to enable it to snugly fit over the tire, and means associated with said rim portion for retaining said rim portion on said tire, said means terminating at such a distance inwardly from the outer periphery of said tire at the other and inner side of said spare tire as to serve as a retaining means after said cover is in proper tire protecting position and at the same time being resiliently expansible to permit of the shoving of said side and rim portions substantially bodily into and out of said proper tire protecting position.

12. A tire cover for spare tires having a substantially circumferentially rigid outer portion for covering the outer side of the tire and a tread covering portion for covering the tread of the tire having its inner edge of a normally larger diameter than that of the outermost periphery of the tire and leaving the inner side wall of the tire exposed, said tread covering portion being provided to the rear of the median plane of the tire with a plurality of resilient retaining elements extending over the rear side of the tire tread and cooperating with said tread portion to resiliently draw the outer side covering portion toward the tire and hold the cover in retaining engagement with the tire.

13. A metallic spare tire cover having a metallic outer side portion for disposition over an outer side wall of the tire, and a metallic tread covering portion for disposition over the tread of the tire having its inner edge of a normally larger diameter than that of the outermost periphery of the tire and leaving the inner side wall of the tire exposed and provided to the rear of the median plane of the tire with resilient cover retaining means extending over the rear side of the tire tread and cooperating with said tread portion to draw the outer side covering portion toward the tire and so as to enable the cover to accommodate variations in size and contour of the tire and to hold the cover in retaining engagement with the tire.

In witness whereof, I have hereunto set my hand at Indianapolis, Indiana, this 16th day of September, A. D. one thousand nine hundred and twenty-seven.

CLARENCE M. ELLENBERGER.